(12) United States Patent
Rui et al.

(10) Patent No.: US 12,574,382 B2
(45) Date of Patent: Mar. 10, 2026

(54) PROVIDING SECURITY WITH DYNAMIC PRIVILEGE LEVEL ASSIGNMENT IN A HYBRID-CLOUD STACK

(71) Applicant: INTERNATIONAL BUSINESS MACHINES CORPORATION, Armonk, NY (US)

(72) Inventors: Huang Rui, Beijing (CN); Li Jun Bj Zhu, Beijing (CN); Shu Juan Zhang, Beijing (CN); Xiao Mei Zheng, Beijing (CN); Zhe Wang, Beijing (CN); Peng Chang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 144 days.

(21) Appl. No.: 18/433,087

(22) Filed: Feb. 5, 2024

(65) Prior Publication Data

US 2025/0254174 A1     Aug. 7, 2025

(51) Int. Cl.
*H04L 29/06* (2006.01)
*H04L 9/40* (2022.01)

(52) U.S. Cl.
CPC .......... *H04L 63/105* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 9,774,586 B1 | 9/2017 | Roche et al. | |
| 10,454,934 B2 | 10/2019 | Parimi et al. | |
| 10,878,079 B2 | 12/2020 | Vepa et al. | |
| 10,965,686 B1 * | 3/2021 | Agarwwal .......... | H04L 63/1425 |
| 11,388,163 B2 | 7/2022 | Bargury et al. | |
| 11,777,948 B2 | 10/2023 | Agarwwval et al. | |
| 2016/0026813 A1 * | 1/2016 | Neitzel ............... | G06F 21/6218 726/17 |

(Continued)

OTHER PUBLICATIONS

W.S. Hsu, et al. , "A role-based authorization model for service-oriented architecture," May 2012, 1 pp. (https://www.researchgate.net/publication/283527410).

(Continued)

*Primary Examiner* — Shin-Hon (Eric) Chen
(74) *Attorney, Agent, or Firm* — Konrad, Raynes, Davda & Victor, LLP; Janaki K. Davda

(57)     ABSTRACT

Security with dynamic privilege level assignment in a hybrid-cloud stack is provided. A request associated with a user is received. For the request, a mapping and an authority structure are retrieved, where the mapping identifies a plurality of services and the authority structure identifies requisite privilege levels of the plurality of services. For the user, an allowed privilege range is retrieved. A current privilege level is set to a minimum privilege level of the allowed privilege range. A requisite privilege level for the request is determined based on the requisite privilege levels of the plurality of services. In response to determining that the current privilege level is less than the requisite privilege level for the request, the current privilege level is escalated based on the allowed privilege range and the requisite privilege level for the request, and the request is processed using the escalated privilege level.

20 Claims, 9 Drawing Sheets

(56) References Cited

U.S. PATENT DOCUMENTS

| | | | |
|---|---|---|---|
| 2017/0111368 A1* | 4/2017 | Hibbert | H04L 63/102 |
| 2017/0163650 A1* | 6/2017 | Seigel | H04L 63/102 |
| 2020/0336489 A1* | 10/2020 | Wuest | G06F 21/45 |
| 2021/0136084 A1* | 5/2021 | Dayan | H04L 63/08 |
| 2022/0229916 A1* | 7/2022 | Soman | G06F 21/604 |
| 2022/0286465 A1 | 9/2022 | Du et al. | |
| 2023/0418785 A1* | 12/2023 | Singh | G06F 21/6218 |
| 2024/0004989 A1* | 1/2024 | Goodridge | G06F 21/51 |
| 2024/0064148 A1* | 2/2024 | Al-Essa | H04L 63/067 |
| 2024/0179147 A1* | 5/2024 | Dayan | H04L 63/0815 |

OTHER PUBLICATIONS

C. Wu, et al., "An access control method of cloud computing resources based on quantified-role," IEEE, IEEE 14th International Conference on Communication Technology, Nov. 9, 2012, 5 pp. (https://ieeexplore.ieee.org/document/6511329).

Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. et al., "The NIST Definition of Cloud Computing (Draft)", Sep. 2011, Computer Security Division Information Technology Laboratory National Institute of Standards and Technology, Total 7 pp.

C. Wu, et al., "An Access Control Method of Cloud Computing Resources Based on Quantified-Role," IEEE, 2012, 5 pp.

* cited by examiner

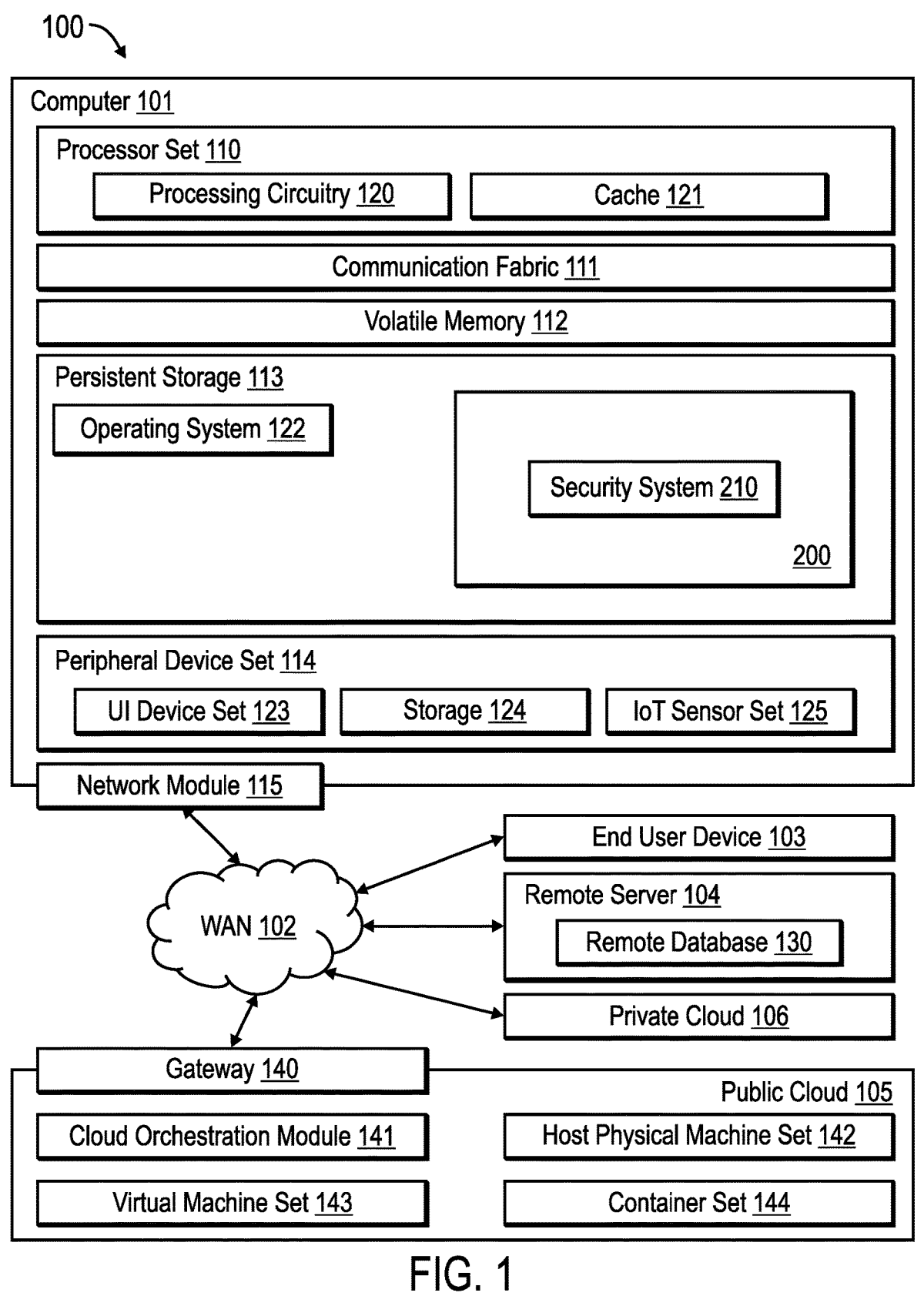

100

Computer 101

Processor Set 110

Processing Circuitry 120  Cache 121

Communication Fabric 111

Volatile Memory 112

Persistent Storage 113

Operating System 122

Security System 210

200

Peripheral Device Set 114

UI Device Set 123  Storage 124  IoT Sensor Set 125

Network Module 115

End User Device 103

Remote Server 104

Remote Database 130

WAN 102

Private Cloud 106

Gateway 140

Public Cloud 105

Cloud Orchestration Module 141

Host Physical Machine Set 142

Virtual Machine Set 143

Container Set 144

FIG. 1

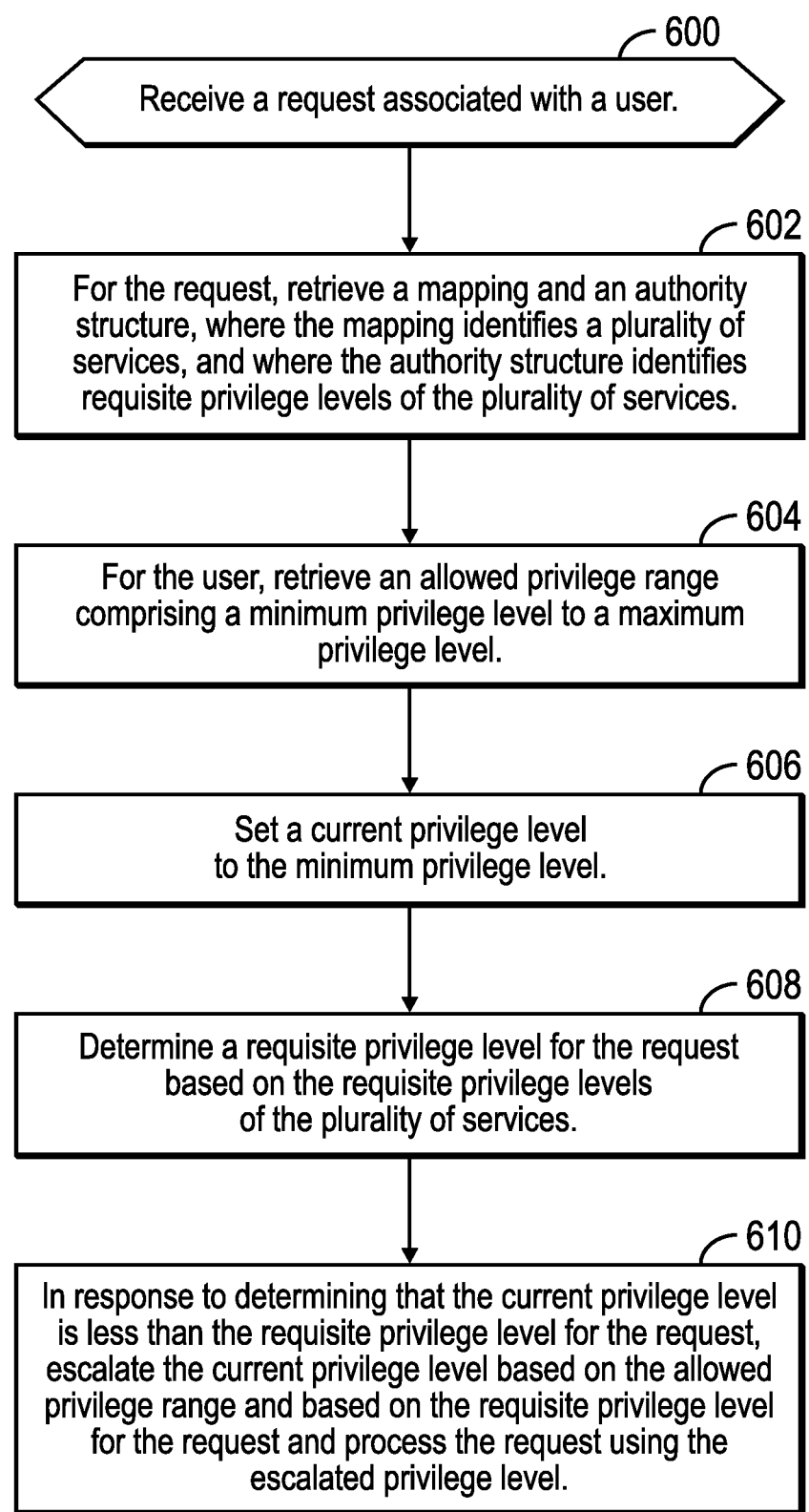

600

Receive a request associated with a user.

602

For the request, retrieve a mapping and an authority structure, where the mapping identifies a plurality of services, and where the authority structure identifies requisite privilege levels of the plurality of services.

604

For the user, retrieve an allowed privilege range comprising a minimum privilege level to a maximum privilege level.

606

Set a current privilege level to the minimum privilege level.

608

Determine a requisite privilege level for the request based on the requisite privilege levels of the plurality of services.

610

In response to determining that the current privilege level is less than the requisite privilege level for the request, escalate the current privilege level based on the allowed privilege range and based on the requisite privilege level for the request and process the request using the escalated privilege level.

FIG. 6

PROVIDING SECURITY WITH DYNAMIC PRIVILEGE LEVEL ASSIGNMENT IN A HYBRID-CLOUD STACK

BACKGROUND

Embodiments of the invention relate to providing security with dynamic privilege level assignment in a hybrid-cloud stack.

A hybrid-cloud stack typically consists of multiple, separated cloud and on-premises (on-prem) environments and a combination of home-grown, legacy, and modern systems. Applications accessing the hybrid-cloud stack may use different identities (e.g., different username and password combinations) to access these environments and systems. Thus, these disjointed environments and systems may result in siloed and duplicated identities, leading to security risks.

Some solutions involve deploying Identity and Access Management (IAM) on a public cloud and connecting to an on-premise or private Identity Provider (IdP-a user directory). While such solutions leverage the capabilities of IAM solutions to manage authorization, the access policies, trust profiles, permission evaluation, and time-based authorization that are supported are mostly pre-defined.

In order to ensure that the various components/micro-services for the applications, such as services running in the public cloud, private cloud or on-premise, are able to call each other, there is a high-privileged account, such as a service account, built into the components/micro-services, which brings additional security risks if the account is leaked.

Even if the application authorizes the communications internally through user login (e.g., a user token, an Application Programming Interface (API) key, etc.), the user is typically granted the highest permissions for that user's role, and the roles of users are mostly pre-defined. This may cause another security risk because a user may have permission to perform some operations that the user does not need access to.

SUMMARY

In accordance with certain embodiments, a computer-implemented method comprising operations is provided for providing security with dynamic privilege level assignment in a hybrid-cloud stack. In such embodiments, a request associated with a user is received. For the request, a mapping and an authority structure are retrieved, where the mapping identifies a plurality of services, and where the authority structure identifies requisite privilege levels of the plurality of services. For the user, an allowed privilege range comprising a minimum privilege level to a maximum privilege level is retrieved. A current privilege level is set to the minimum privilege level. A requisite privilege level for the request is determined based on the requisite privilege levels of the plurality of services. In response to determining that the current privilege level is less than the requisite privilege level for the request, the current privilege level is escalated based on the allowed privilege range and the requisite privilege level for the request, and the request is processed using the escalated privilege level.

In accordance with other embodiments, a computer program product comprising a computer readable storage medium having program code embodied therewith is provided, where the program code is executable by at least one processor to perform operations for providing security with dynamic privilege level assignment in a hybrid-cloud stack.

In such embodiments, a request associated with a user is received. For the request, a mapping and an authority structure are retrieved, where the mapping identifies a plurality of services, and where the authority structure identifies requisite privilege levels of the plurality of services. For the user, an allowed privilege range comprising a minimum privilege level to a maximum privilege level is retrieved. A current privilege level is set to the minimum privilege level. A requisite privilege level for the request is determined based on the requisite privilege levels of the plurality of services. In response to determining that the current privilege level is less than the requisite privilege level for the request, the current privilege level is escalated based on the allowed privilege range and the requisite privilege level for the request, and the request is processed using the escalated privilege level.

In accordance with yet other embodiments, a computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for providing security with dynamic privilege level assignment in a hybrid-cloud stack. In such embodiments, a request associated with a user is received. For the request, a mapping and an authority structure are retrieved, where the mapping identifies a plurality of services, and where the authority structure identifies requisite privilege levels of the plurality of services. For the user, an allowed privilege range comprising a minimum privilege level to a maximum privilege level is retrieved. A current privilege level is set to the minimum privilege level. A requisite privilege level for the request is determined based on the requisite privilege levels of the plurality of services. In response to determining that the current privilege level is less than the requisite privilege level for the request, the current privilege level is escalated based on the allowed privilege range and the requisite privilege level for the request, and the request is processed using the escalated privilege level.

BRIEF DESCRIPTION OF THE DRAWINGS

Referring now to the drawings in which like reference numbers represent corresponding parts throughout:

FIG. 1 illustrates a computing environment in accordance with certain embodiments.

FIG. 6 illustrates, in a flowchart, operations for providing security in accordance with certain embodiments.

DETAILED DESCRIPTION

Figure 2:
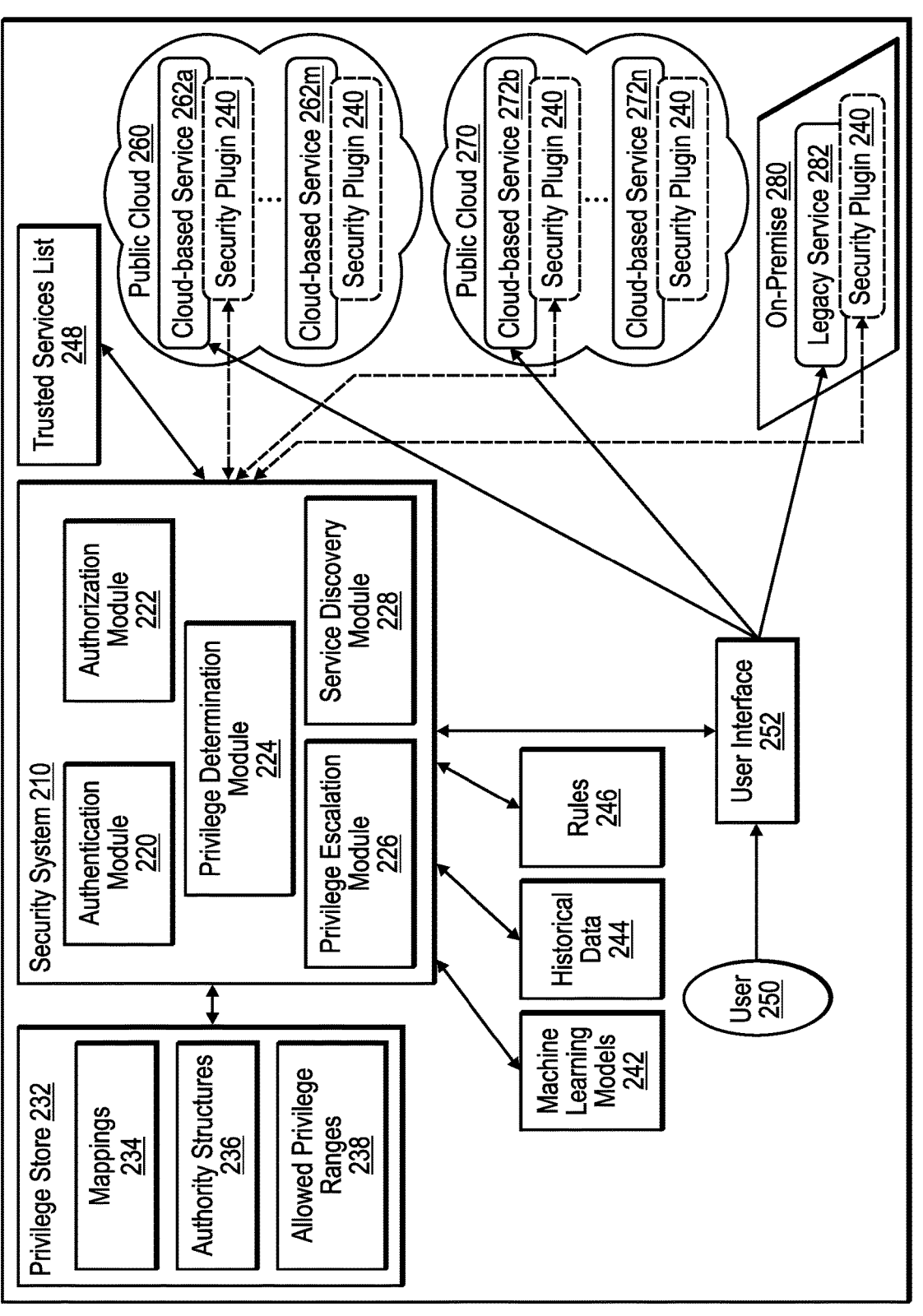
FIG. 2 illustrates a computing environment with details of a security system in accordance with certain embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 of FIG. 1 contains an example of an environment for the execution of at least some of the computer code involved in performing the inventive methods, such as a security system 210 of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The security system 210 helps manage user permissions and privilege levels centrally in a hybrid-cloud stack. In addition, the security system 210 manages the privilege levels of a user dynamically.

FIG. 2 illustrates a computing environment with details of the security system 210 in accordance with certain embodiments. The security system 210 provides dynamic privilege level assignment in the hybrid-cloud stack. The security system 210 includes an authentication module 220, an authorization module 222, a privilege determination module 224, a privilege escalation module 226, and a service discovery module 228. The security system 210 communicates with a privilege store 232, which stores mappings 234, authority structures 236, and allowed privilege ranges 238. The security system 210 may also use one or more machine learning models 242, historical data 244, and/or rules 246 to generate any of the mappings 234, authority structures 236, and allowed privilege ranges 238. The authority structures 236 may be graphs, tables, etc. The allowed privilege ranges 238 may be referred to as allowed privilege boundaries. The service discovery module 228 performs a periodic check of which services are trusted and maintains a trusted services list 248 that identifies the services that are trusted.

A user 250 uses a user interface 252 to access a public cloud 260, a private cloud 270 and/or an on-premise environment 280. The public cloud 260 includes cloud-based services 262a . . . 262m. The private cloud 270 includes cloud-based services 272b . . . 272n. The on-premise environment 280 includes at least one legacy service 282. Each cloud-based service 262a . . . 262m, 272b . . . 272n, and the legacy service 282 includes a security plugin 240 that communicates with the security system 210.

The authentication module 220 verifies whether the login user is a valid user. The authorization module 222 verifies whether the login user has proper privilege to process a request.

The privilege determination module 224 generates mappings 234 and authority structures 236, which are stored in the privilege store 232. In certain embodiments, the privilege determination module 224 generates mappings 234 of requests (e.g., frontend service requests or service requests) and services (e.g., backend services, such as microservices) that process the requests. The privilege determination module 224 may generate the mappings 234 (e.g., based on historical knowledge that indicates which services were used to execute the requests in the past).

In certain embodiments, the privilege determination module 224 generates an authority structure 236 for each of the mappings that indicates requisite privilege levels for the services identified in the mappings 234.

For example, a mapping 234 indicates that request A calls API B of microservice_1 and API C of microservice_2 to update a record, while the authority structure 236 indicates that, to process the request A, the user should have the requisite privilege level of API B and the requisite privilege level of API C.

In certain embodiments, the privilege determination module 224 generates allowed privilege ranges of users based on their roles (e.g., pre-defined roles such as: viewer, deployer, administrator, etc.) by analyzing those roles with different aggregation models and classifier models. An aggregation model may be described as a model that aggregates data. A classifier model may be described as a model that receives the aggregated data as input and outputs one or more classifications, such as an allowed privilege range or a minimum privilege level.

For example, when the user has an administrator role, the privilege determination module 224 determines that the administrator role gets most requests in one scope. The allowed privilege ranges indicate the minimum privilege the user needs and the maximum privilege that the user needs. The allowed privilege ranges are stored in the privilege store 232. Initially, the security system 210 assigns the user the minimum privilege from the allowed privilege range.

In certain embodiments, the request is initiated by a user from a service that includes the user identity (e.g. a user web login or exposed Representational State Transfer (REST) API).

The privilege escalation module 226 validates whether the request a user makes may be completed with the current privilege level. The privilege escalation module 226 may escalate the user's privilege level based on the privilege range of the allowed privilege ranges and/or based on rules. For example, a rule may indicate that escalation is approved if the request comes from a trusted service (i.e., a trusted serviced used by a user to make the request) and the level of escalation is within the allowed privilege range associated with the request. Moreover, the privilege escalation module 226 restores the escalated privilege level (e.g., to a minimum privilege level) once the request completes.

The service discovery module 228 collects information (e.g., the location, the Uniform Resource Locator (URL), the Transport Layer Security (TLS) certificate, etc.) of trusted microservices by communicating with the security plugins 240 running on individual microservices. In certain embodiments, each cloud-based service 262a . . . 262m, 272b . . . 272n and the legacy service 282 are microservices.

In certain embodiments, the user 250 issues a request via a user interface 252. The security system 210 determines the privilege level for the request and sends the request with that privilege level to the cloud-based service 262a . . . 262m, the cloud-based service 272b . . . 272n or the legacy service 282.

Figure 3:
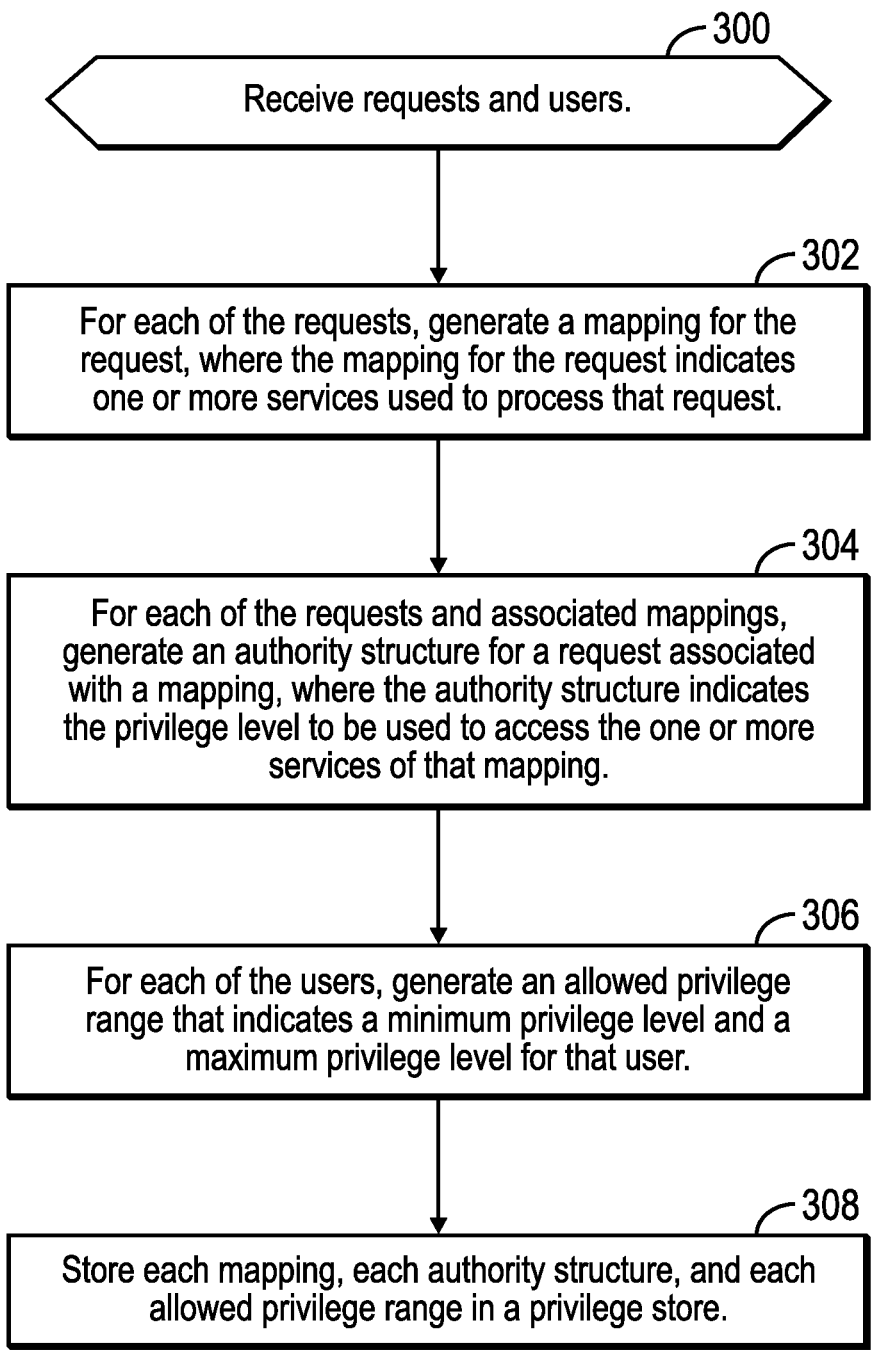
FIG. 3 illustrates, in a flowchart, operations for generating data for a privilege store in accordance with certain embodiments.

FIG. 3 illustrates, in a flowchart, operations for generating data for a privilege store 232 in accordance with certain embodiments. Control begins at block 300 with the security system 210 receiving requests and users. For example, a system administrator may identify these requests and users and store them in a data store for retrieval by the security system 210.

In block 302, for each of the requests, the security system 210 generates a mapping 234 for the request, where the mapping 234 for the request indicates one or more services used to process that request. In certain embodiments, the security system 210 generates the mappings 234 for the requests based on historical data 244 and/or rules 246.

In block 304, for each of the requests and associated mappings 234, the security system 210 generates an authority structure 236 for a request associated with a mapping 234, where the authority structure 236 indicates the privilege level to be used to access each of the one or more services of that mapping 234. For example, if there are five services, then the authority structure 236 indicates five corresponding privilege levels. The privilege levels of any subset of the one or more services may be the same or different. In certain embodiments, the security system 210 generates the authority structures 236 based on historical data 244 and/or rules 246.

In block 306, for each of the users, the security system 210 generates an allowed privilege range 238 that indicates a minimum privilege level and a maximum privilege level for that user. The allowed privilege range 238 may also be described as an allowed privilege range 238. For example, an allowed privilege range may be privilege level 4 to privilege level 10 (where privilege level 10 is a higher privilege level). In certain embodiments, the security system 210 generates the allowed privilege ranges 238 based on historical data 244 and/or rules 246.

In block 308, the security system 210 stores each mapping 234, each authority structure 236, and each allowed privilege range 238 in a privilege store 232.

In certain embodiments, the system administrator (or other user) assigns roles to users. In such embodiments, in block 300 the security system 210 receives requests and roles, and, in block 306, for each of the roles, the security system 210 generates an allowed privilege range 238. In such embodiments, many users may have the same role.

Figure 4:
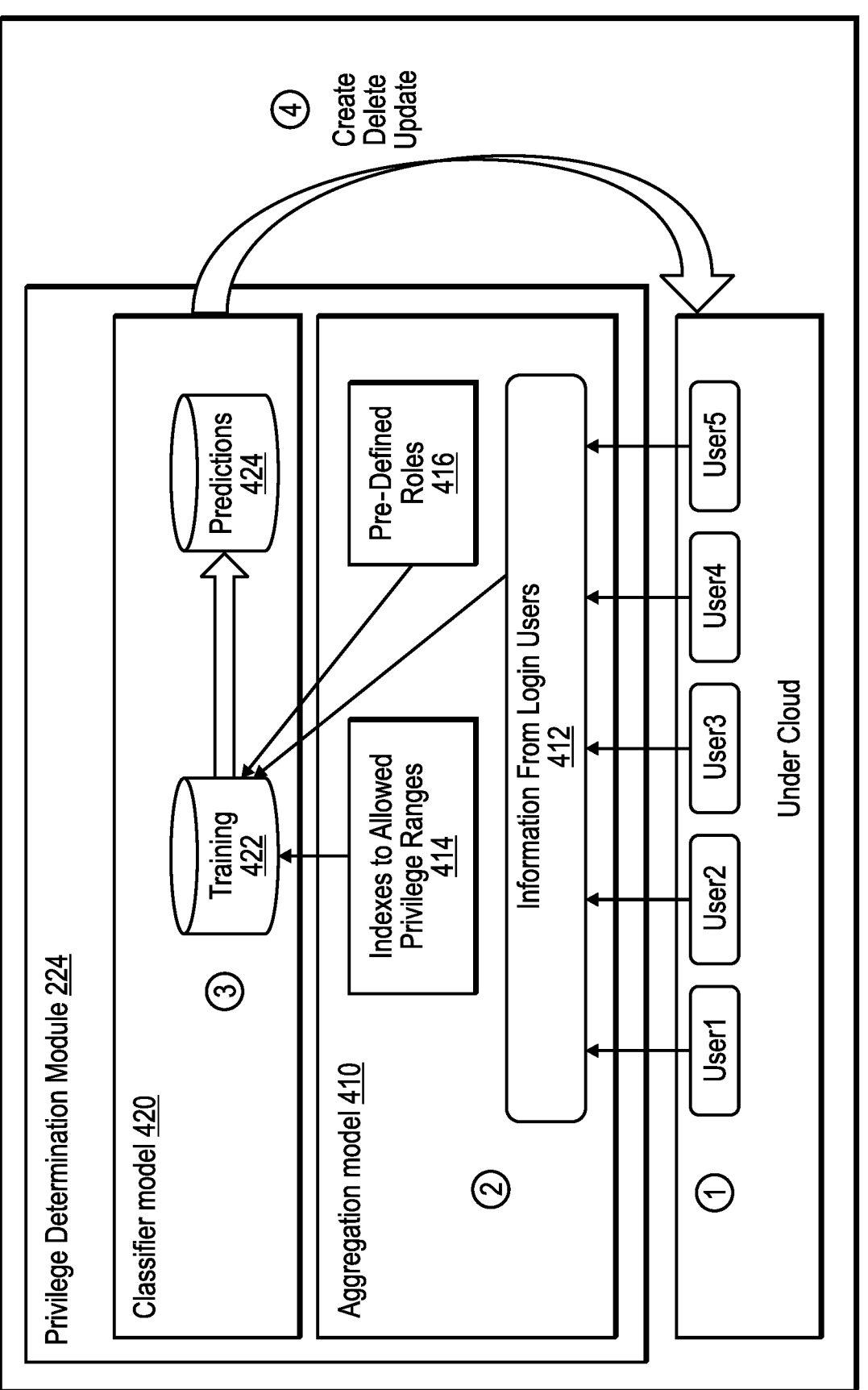
FIG. 4 illustrates details of a privilege determination module in accordance with certain embodiments.

FIG. 4 illustrates details of the privilege determination module 224 in accordance with certain embodiments. The privilege determination module 224 includes an aggregation model 410 and a classifier model 420. In certain embodiments, the aggregation model 410 and the classifier model 420 are examples of machine learning models 242.

In certain embodiments, a system administrator (or other user) assigns roles to users, such as User1, User2, User3, User4, and User5. Then, the aggregation model 410 aggregates data. In certain embodiments, the aggregation model 410 aggregates information from login users 412, indexes to allowed privilege ranges 414, and pre-defined roles 416 (e.g., initialization data). The aggregation model 410 sends the aggregated data to the classifier model 420. In certain embodiments, an allowed privilege range is an index into a database storing allowed privilege ranges, where the index identifies the allowed privilege range for a particular user.

The classifier model 420 is trained 422 using the aggregated data. In operation, the classifier model 420 outputs predictions 424. In certain embodiments, the classifier model 420 predicts the minimum privilege level of each role. For example, for the administrator role, the classifier model 420 receives aggregated data about different users having the administrator role and requests that they have processed (i.e., historical data as part of information from login users 412). Then, the classifier model 420 determines that a particular privilege level may be used to complete a certain percentage (e.g., 80%) of requests from the users having the administrator role, and the classifier model 420 outputs this particular privilege level as the minimum privilege level. Next, the privilege determination module 224 creates new users, deletes existing users or updates existing users based on the predictions.

In certain embodiments, the information from login users 412 includes pre-initialized login users who, by default, have minimum authority (i.e., a minimum privilege level). In certain embodiments, the aggregation model 410 collects and aggregates user policies and user requests issued on the cloud environment to generate aggregated data that is sent to the classifier model 420. In certain embodiments, the classifier model 420 sorts the user policies to generate pre-initialized user groups or user policies. In certain embodiments, the training of the classifier model 420 enables optimizing the pre-initialized user groups and dynamically adjusting the pre-initialized user groups or user policies.

In certain embodiments, the security system 210 assigns a user a role with a particular privilege level. In certain embodiments, for each role, the security system 210 has 2 properties: 1) permitted-requests-list: $\{x1, x2, x3\}$ and permission-enhanced-requests-list: $\{x1, x2, x3, x4, x5\}$. The security system 210 allows the user to perform requests according to the role. In certain embodiments, the security plugin 240 monitors the user actions of issuing requests. When the user attempts to conduct a request (e.g., request x4), which is not allowed with the current privilege level, but which is in the permitted request list, the security system 210 may escalate (i.e., increase) the privilege level to enable the user to perform the request (e.g., request x4). In addition, when the user attempts to conduct a request (e.g., request x6), which is not allowed with the current privilege level and which is not in the permitted request list, the security system 210 denies the request (e.g., by sending a "permission denied" message). In this manner, the security system 210 authorizes users to issue requests across multiple platforms, enhancing security in hybrid cloud environments.

FIGS. 5A, 5B, 5C, and 5D illustrate, in a flowchart, operations for processing a request based on one or more privilege levels in accordance with certain embodiments.

Control begins at block 500 with the security system 210 receiving a request associated with a user. In certain embodiments, the request may be referred to as a service request as the user uses a service to initiated the request. In certain embodiments, the user has a role (e.g., viewer, deployer, administrator, etc.). In certain embodiments, the user issues the request using a service. In block 502, for the request, the security system 210 retrieves a mapping 234 and an authority structure 236 from the privilege store 232, where the mapping 234 identifies one or more services, and where the authority structure 236 identifies a requisite privilege level for each of the one or more services In block 504, for the user, the security system 210 retrieves an allowed privilege range 238 from the privilege store 232, where the allowed privilege range 238 indicates a range from a minimum privilege level to a maximum privilege level. In certain embodiments, the allowed privilege range 238 indicates the minimum privilege level and the maximum privilege level and may optionally indicate other privilege levels.

In block 506, the security system 210 sets a current privilege level for the request as the minimum privilege level of the allowed privilege range 238. In certain embodiments, the current privilege level is for the user and for a particular role of the user at the time of issuing the request. In certain embodiments, the minimum privilege level is predicted using the classifier model 420.

Figure 5A:
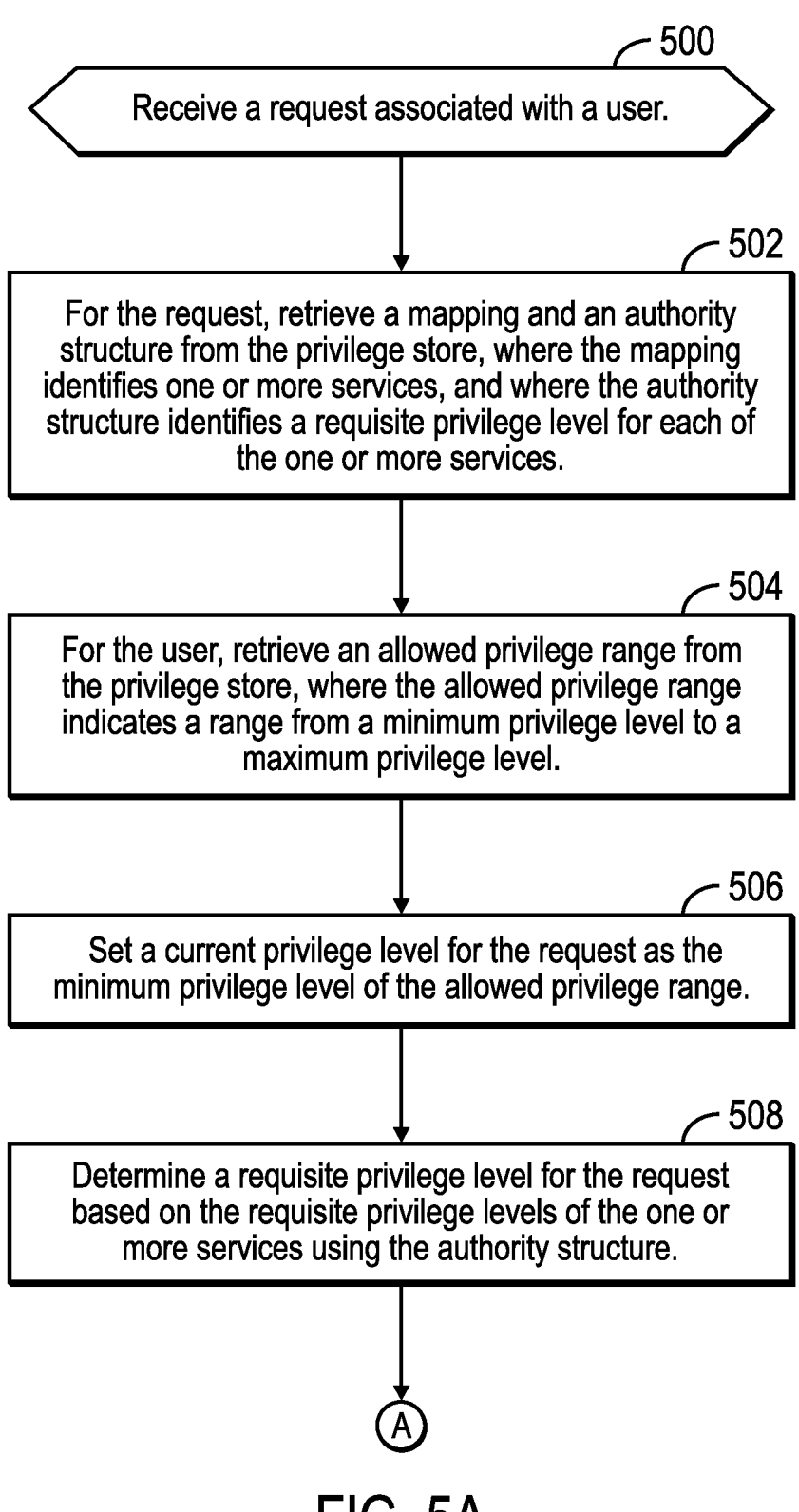
FIGS. 5A, 5B, 5C, and 5D illustrate, in a flowchart, operations for processing a request based on one or more privilege levels in accordance with certain embodiments.
Figure 5B:
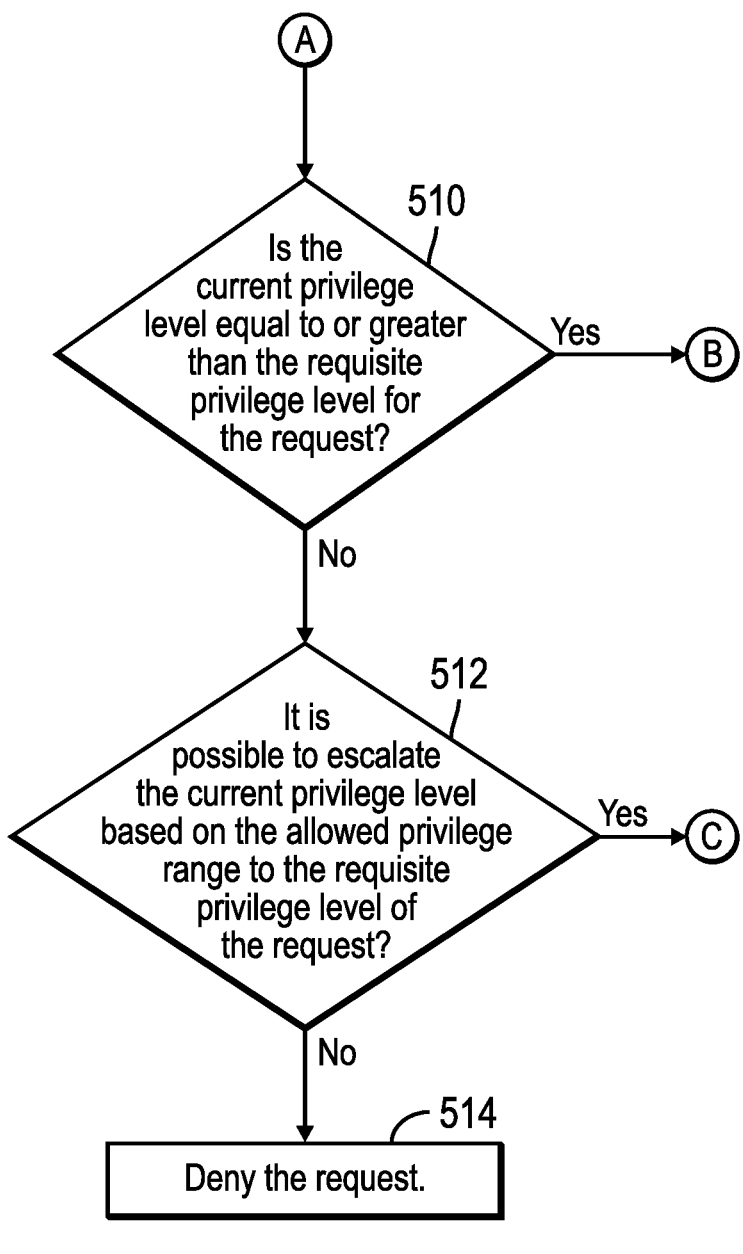

In block 508, the security system 210 determines a requisite privilege level for the request based on the requisite privilege levels of the one or more services using the authority structure 236. The requisite privilege level may be described as the privilege level required to access each of the one or more services. For example, if the authority structure 236 indicates that, to process the request, the user should have the requisite privilege level of 4 for service A and the requisite privilege level of 7 for service B, then the security system 210 selects the requisite privilege level of 7 (i.e., the higher privilege level) for the request. From block 508 (FIG. 5A), processing continues to block 510 (FIG. 5B).

In block 510, the security system 210 determines whether the current privilege level is equal to or greater than the requisite privilege level for the request. That is, the security system 210 determines whether the privilege level is enough for the request to invoke the one or more services. If so, processing continues to block 516 (FIG. 5C), otherwise (i.e., the current privilege level is less than the requisite privilege level), processing continues to block 512.

In block 512, the security system 210 determines whether it is possible to escalate the current privilege level based on the allowed privilege range 238 to the requisite privilege level of the request. If so, processing continues to block 522 (FIG. 5D), otherwise, processing continues to block 514. In certain embodiments, blocks 522 and 526 are optional and processing continues to block 524.

In block 514, the security system 210 denies the request. This may include the security system 210 sending a notification that the request could not be processed to lack of the requisite privilege level.

In block 516, the security system 210 processes the request by invoking the one or more services using the current privilege level. This may include the security system 210 invoking the one or more services to perform operations for the request and receiving responses from the one or more services.

In block 518, the security system 210 determines whether the current privilege level was escalated. If so, processing continues to block 520, otherwise, processing of the request is done. Once this request is done, another request may be processed.

In block 520, the security system 210 sets the current privilege level to the minimum privilege level and processing of the request is done. That is, if the current privilege level was escalated, it is now de-escalated.

In block 522, the security system 210 determines whether the request is from a trusted service on the trusted services list 248. If so, processing continues to block 524, otherwise, processing continues to block 526.

Figure 5C:
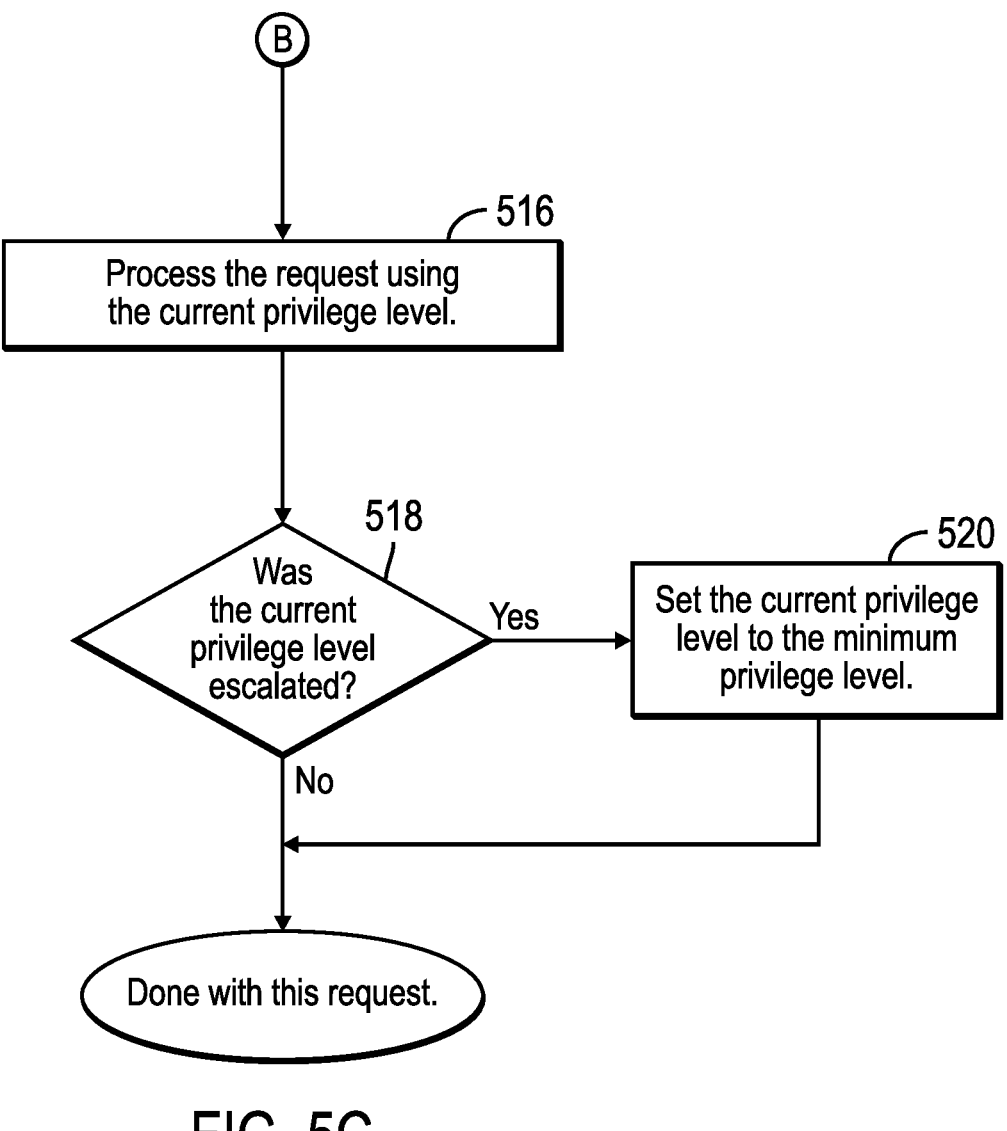
Figure 5D:
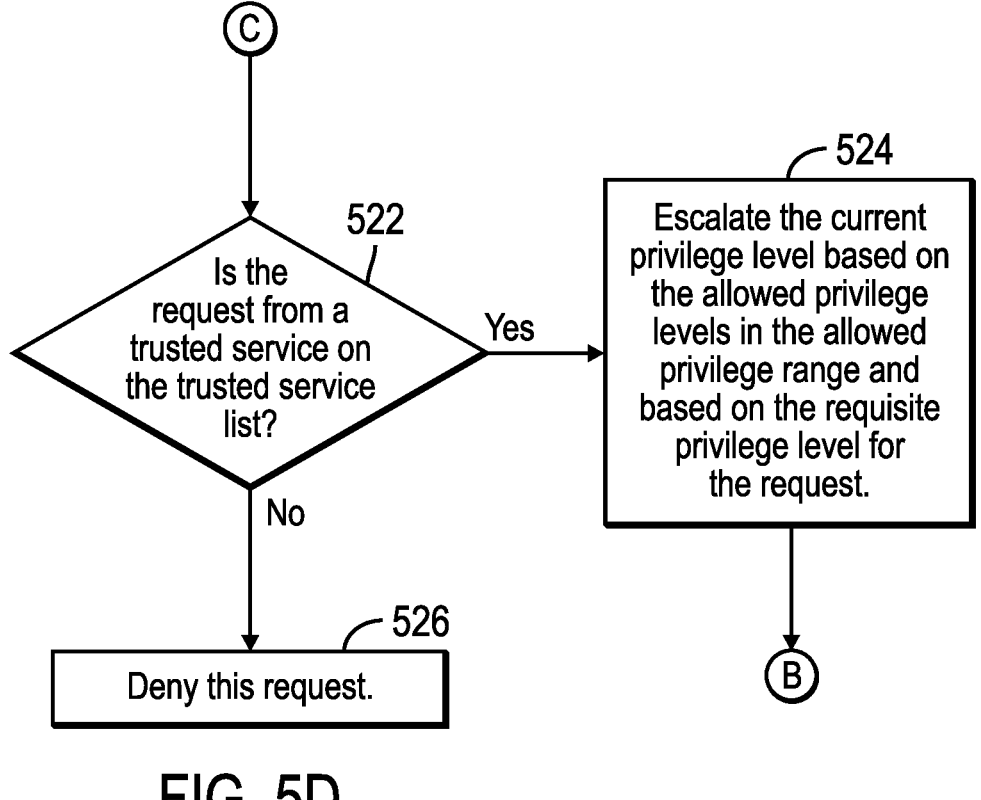

In block 524, the security system 210 escalates the current privilege level based on the allowed privilege levels in the allowed privilege range 238 and the requisite privilege level for the request, and then processing continues to block 516 (FIG. 5C). In certain embodiments, the current privilege level is set to a higher privilege level. In certain embodiments, escalating the current privilege level may involve increasing the current privilege level to a privilege level available in the range of allowed privilege ranges that equals or exceeds the requisite privilege level for the request.

In block 526, the security system 210 denies the request. This may include the security system 210 sending a notification that the request could not be processed to lack of the requisite privilege level.

FIG. 6 illustrates, in a flowchart, operations for providing security in accordance with certain embodiments. Control begins at block 600 with the security system 210 receiving a request associated with a user. In block 602, the security system 210, for the request, retrieves a mapping and an authority structure, where the mapping identifies a plurality of services, and where the authority structure identifies requisite privilege levels of the plurality of services. In block 604, the security system 210, for the user, retrieves an allowed privilege range comprising a minimum privilege level to a maximum privilege level. In block 606, the security system 210 sets a current privilege level to the minimum privilege level. In block 608, the security system 210 determines a requisite privilege level for the request based on the requisite privilege levels of the plurality of services. In block 610, in response to determining that the current privilege level is less than the requisite privilege level for the request, the security system 210 escalates the current privilege level based on the allowed privilege range and processes the request using the escalated privilege level. Processing the request may be described as executing the request using the plurality of services to perform one or more operations (e.g., updating data). Operations may be described as tasks.

In certain embodiments, each of the plurality of services has a different requisite privilege level.

In certain embodiments, in response to determining that the current privilege level is equal to or exceeds the requisite privilege level for the request, the security system 210 processes the request using the current privilege level.

In certain embodiments, in response to determining that the current privilege level is less than the requisite privilege level for the request and cannot be escalated, the security system 210 denies the request.

In certain embodiments, the security system 210 periodically identifies services that are trusted and adds the services that are trusted to a trusted services list.

In certain embodiments, the current privilege level is escalated in response to determining that the request was initiated from a service on the trusted services list.

In certain embodiments, the request is denied in response to determining that the request was initiated from a service not on the trusted services list.

The security system 210 provides dynamic privilege level adjustment (i.e., dynamic permission adjustment). In certain embodiments, the security system 210 dynamically adjusts privilege levels (i.e., user permissions) based on the requests the users desire to perform, reducing the risk of giving more (higher) privilege levels (i.e., access rights) than required to execute a request.

The security system 210 provides minimized default authority. In certain embodiments, by default, the security system 210 minimizes the authority granted to a user, thereby limiting the possible damage in case of a security breach.

The security system 210 provides privilege escalation. In certain embodiments, the security system 210 provides a secure way for users to temporarily escalate their privileges to perform desired requests. This ensures that operations requiring higher privileges may be performed securely.

The security system 210 provides credential management. The security system 210 eliminates the need to store credential information on unmanaged platforms, reducing the risk of credential leakage.

The security system 210 performs cross-platform authorization. In certain embodiments, the security system 210 authorizes individual services across multiple platforms, enhancing security in hybrid cloud environments.

Thus, the security system 210 dynamically adjusts users' permissions for requests (e.g., from applications or services operating across different platforms and locations). With this approach, the security system 210 avoids storing credential information on platforms (e.g., public cloud platforms) not under management of the security system 210.

In addition, the security system 210 authorizes access and communications among individual services across multiple platforms through sign-in users. By default, the authority of the login user is minimized, and the security system 210 provides a privilege escalation system to allow sign-in users to dynamically and automatically execute requests associated with higher privileges.

The security system 210 provides a secure, flexible, and adaptive way to manage user permissions and authorizations in the hybrid-cloud stack.

The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer-implemented method, comprising operations for:

predicting allowed privilege ranges for different roles using a classifier model, wherein the classifier model is trained with input of a plurality of pre-defined roles, information of a plurality of users, and allowed privilege ranges;

receiving a request associated with a user having a role of the different roles;

using a mapping to identify a plurality of services that process the request;

using an authority structure to identify requisite privilege levels of the plurality of services;

retrieving an allowed privilege range from the predicted allowed privilege ranges comprising a minimum privilege level to a maximum privilege level that is associated with the role of the user;

setting a current privilege level for the role to the minimum privilege level;

determining a requisite privilege level for the request based on the requisite privilege levels of the plurality of services that process the request;

in response to determining that the current privilege level is less than the requisite privilege level for the request, in response to determining that the request was initiated from a service on a trusted services list, escalating the current privilege level based on the allowed privilege range and the requisite privilege level for the request; and processing the request using the escalated privilege level.

2. The computer-implemented method of claim 1, wherein each of the plurality of services has a different requisite privilege level.

3. The computer-implemented method of claim 1, further comprising operations for:

in response to determining that the current privilege level is equal to or exceeds the requisite privilege level for the request, processing the request using the current privilege level.

4. The computer-implemented method of claim 1, further comprising operations for:

in response to determining that the current privilege level is less than the requisite privilege level for the request and cannot be escalated, denying the request.

5. The computer-implemented method of claim 1, further comprising operations for:

periodically identifying services that are trusted; and adding the services that are trusted to trusted services list.

6. The computer-implemented method of claim 5, wherein the request is denied in response to determining that the request was initiated from another service not on the trusted services list.

7. The computer-implemented method of claim 1, further comprising operations for:

generating mappings including the mapping from first historical data and first rules; and generating authority structures including the authority structure from second historical data and second rules.

8. A computer program product, the computer program product comprising a computer readable storage medium having program instructions embodied therewith, the program instructions executable by a processor to cause the processor to perform operations for:

predicting allowed privilege ranges for different roles using a classifier model, wherein the classifier model is trained with input of a plurality of pre-defined roles, information of a plurality of users, and allowed privilege ranges;

receiving a request associated with a user having a role of the different roles;

using a mapping to identify a plurality of services that process the request;

using an authority structure to identify requisite privilege levels of the plurality of services;

retrieving an allowed privilege range from the predicted allowed privilege ranges comprising a minimum privilege level to a maximum privilege level that is associated with the role of the user;

setting a current privilege level for the role to the minimum privilege level;

determining a requisite privilege level for the request based on the requisite privilege levels of the plurality of services that process the request;

in response to determining that the current privilege level is less than the requisite privilege level for the request, in response to determining that the request was initiated from a service on a trusted services list, escalating the current privilege level based on the allowed privilege range and the requisite privilege level for the request; and processing the request using the escalated privilege level.

9. The computer program product of claim 8, wherein each of the plurality of services has a different requisite privilege level.

10. The computer program product of claim 8, wherein the program instructions are executable by the processor to cause the processor to perform further operations for:

in response to determining that the current privilege level is equal to or exceeds the requisite privilege level for the request, processing the request using the current privilege level.

11. The computer program product of claim 8, wherein the program instructions are executable by the processor to cause the processor to perform further operations for:

in response to determining that the current privilege level is less than the requisite privilege level for the request and cannot be escalated, denying the request.

12. The computer program product of claim 8, wherein the program instructions are executable by the processor to cause the processor to perform further operations for:

periodically identifying services that are trusted; and adding the services that are trusted to the trusted services list.

13. The computer program product of claim 12, wherein the request is denied in response to determining that the request was initiated from another service not on the trusted services list.

14. The computer program product of claim 8, wherein the program instructions are executable by the processor to cause the processor to perform further operations for:

generating mappings including the mapping from first historical data and first rules; and generating authority structures including the authority structure from second historical data and second rules.

15. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

predicting allowed privilege ranges for different roles using a classifier model, wherein the classifier model is trained with input of a plurality of pre-defined roles, information of a plurality of users, and allowed privilege ranges;

receiving a request associated with a user having a role of the different roles;

using a mapping to identify a plurality of services that process the request;

using an authority structure to identify requisite privilege levels of the plurality of services;

retrieving an allowed privilege range from the predicted allowed privilege ranges comprising a minimum privilege level to a maximum privilege level that is associated with the role of the user;

setting a current privilege level for the role to the minimum privilege level;

determining a requisite privilege level for the request based on the requisite privilege levels of the plurality of services that process the request;

in response to determining that the current privilege level is less than the requisite privilege level for the request, in response to determining that the request was initiated from a service on a trusted services list, escalating the current privilege level based on the allowed privilege range and the requisite privilege level for the request; and processing the request using the escalated privilege level.

16. The computer system of claim 15, wherein each of the plurality of services has a different requisite privilege level.

17. The computer system of claim 15, wherein the program instructions perform further operations comprising:

in response to determining that the current privilege level is equal to or exceeds the requisite privilege level for the request, processing the request using the current privilege level.

18. The computer system of claim 15, wherein the program instructions perform further operations comprising:

in response to determining that the current privilege level is less than the requisite privilege level for the request and cannot be escalated, denying the request.

19. The computer system of claim 15, wherein the program instructions perform further operations comprising:

periodically identifying services that are trusted; and
adding the services that are trusted to the trusted services list.

20. The computer system of claim 15, wherein the program instructions perform further operations comprising:

generating mappings including the mapping from first historical data and first rules; and
generating authority structures including the authority structure from second historical data and second rules.

* * * * *